3,280,177
PREPARATION OF TERPENE ALLYLIC ESTERS WITH DIMETHYL SULFOXIDE AS CATALYTIC SOLVENT
Robert L. Webb, Jacksonville, Fla., assignor to Union Bag-Camp Paper Corporation, New York, N.Y., a corporation of Virginia
No Drawing. Filed Nov. 19, 1963, Ser. No. 324,831
15 Claims. (Cl. 260—489)

This invention is concerned with converting terpene halides to the corresponding terpene acyloxy compounds by treatment of the halides with salts of carboxylic acids. It is more particularly concerned with improvements in the conversion of terpenic allylic chlorides to the corresponding esters by treatment with salts of carboxylic acids in the presence of dimethyl sulfoxide which functions as catalyst solvent for the displacement of the chloride group by the acyloxy group.

It is known to produce terpenic allylic halides in several ways, such as:

(A) Additions of hydrogen halide to terpenes possessing conjugate unsaturation, usually hydrogen chloride for reasons of economy, though hydrogen bromide is satisfactory and in some cases gives a halide of superior reactivity. It is known to produce linalyl/geranyl/neryl chloride or bromide by addition of the appropriate hydrogen halide to pyrcene in mol/mol ration and to produce the corresponding 2-halo-dihydro linalyl/geranyl/neryl halide by addition of two moles of hydrogen chloride or bromide to one of myrcene. Other terpenes possessing a conjugate system of double bonds which readily add a mole of hydrogen chloride or bromide to form allylic halides are alloocimene, ocimene, alpha terpinene, the phellandrenes, the pyronenes and p-menthadiene-2,3(8). Those dehydroterpenes containing a conjugate system of double bonds such as verbenene, dehydrophellandrenes and dehydromyrcene also readily add hydrogen chloride or bromide to produce allylic terpene halides.

(B) Unsaturated terpenes or dihydroterpenes can be chlorinated or brominated to yield allylic chlorides (bromides). Thus, on chlorination, alpha pinene yields pinocarvyl chloride, limonene yields carvyl chloride, carvomenthene yields carvotanacetyl chloride, myrcene yields 3-chloro-2-methyl-6-methylene-1,7 ocatdiene, 3-menthene yields 5-chloro-3-menthene. Also, alpha terpinene, gamma terpinene, terpinolene, pyronenes, alloocimene, the dihydroallooocimenes, the dihydro myrcenes and 3-carene all can be chlorinated or brominated to yield allylic terpenic halides.

For the purpose of this specification, a terpene is defined as a hydrocarbon containing ten carbon atoms in an unbroken chain and a terpenic allylic halide is a terpenic allylic chloride or bromide.

Terpenic allylic chlorides can also be produced by chlorination of substituted hydrocarbons. Thus alpha terpineol, which may be considered 8-hydroxy carvomenthene yields 8-hydroxy carvotanacetyl chloride. Bromination of alpha terpinyl chloride yields 8-chloro-carvotanacetyl bromide.

Terpenic allylic halides are therefore readily available from domestic raw materials and when treated with salts of carboxylic acids yield allylic terpenic esters which are useful in perfumery and flavor as such. They may also be saponified to produce the free alcohols which are also used in perfumery and flavor. Thus, myrcene hydrochloride yields geranyl acetate which is useful as such or may be saponified to geraniol. In turn, geraniol may be used as such or may be converted by hydrogenation to citronellol, also useful in the same industry. Carvyl chloride similarly yields carvyl esters and the carveols, compounds of the spearmint family and 5-chloro-3-menthene yields compounds useful as intermediates to reproduce compounds found in peppermint flavors.

The allylic terpenic halides are relatively reactive as compared to non-allylic terpenic halides, but are not converted in high yields to the esters by heating them with salts of carboxylic acids unless a catalyst is present. The allylic terpenic halides dehydrohalogenate relatively easily, so that at temperatures of say 80° C. to 150° C., where their reaction rates with salts of carboxylic acids are fairly rapid, the accompanying dehydrohalogenation severely limits the yield of ester product and relatively large amounts of hydrocarbons are formed. While the stability of terpenic allylic halides varies considerably, depending on the structure of the compound, it is found desirable to employ as low a temperature for the conversion to esters as is consistent with reasonable and economic reaction time.

It has been found that the reaction of the allylic terpenic halide with the carboxylic acid salt is catalyzed by the presence of dimethyl sulfoxide, which acts as a "solvent catalyst." By "solvent catalyst" is meant that for the purposes of this invention it is preferred to use dimethyl sulfoxide in quantities that are larger than the trace amounts of catalysts used in many processes. Thus hydrogenations may frequently be conducted in the presence of only 0.01% or less metal catalyst, based on the weight of the substrate, but it is preferred to use about 5% dimethyl sulfoxide, based on the weight of the allylic terpenic halide, and at times quantities up to 200% or more are preferred. As shown in Example 1, higher reaction rates are obtained with larger ratios of dimethyl sulfoxide/terpenic allylic halide, though of course in practice the economics of the process must be considered, so that handling of very large quantities of dimethyl sulfoxide—about 500%—though possible, becomes less economic than compromising for a somewhat lower reaction rate. Instead of "solvent catalyst," one could use the term "weak catalyst," implying that much more of a weak catalyst is required to achieve economic results than would be a "strong catalyst." The mechanism of the catalytic effect of dimethyl sulfoxide is not known, though it is known to react slowly with reactive halides such as methyl iodide, in which case it forms trimethyl sulfoxonium iodide which is known to be a methylating agent. A similar reaction may take place with the very reactive terpenic allylic halides, so that the intermediate sulfoxonium halide reacts with the salt of the carboxylic acid to regenerate dimethyl sulfoxide and form the terpenic allylic ested. Irrespective of the explanation of mechanism, dimethyl sulfoxides does catalyze the replacement of the halide in a terpenic allylic halide by the acyloxy group of the carboxylic acid salt, so that much improved yields of terpenic allylic esters are produced.

It is accordingly an object of this invention to provide an improved method for reacting allylic terpenic halides with salts of carboxylic acids to produce esters.

Another object is to provide a catalyst for reacting allylic terpenic chlorides or bromides with salts of carboxylic acids to produce allylic terpenic esters.

Another object is to provide a method for obtaining high yields of terpenic allylic esters and alcohols from inexpensive domestic raw materials.

In conducting the process of this invention an allylic terpenic halide is treated with a salt of a carboxylic acid in the presence of dimethyl sulfoxide at temperatures ranging from ambient to about 175° C., depending on the stability of the halide. Halides such as geranyl chloride give good yields at temperatures up to say 140° C. if the mixture is heated batchwise or even higher temperatures may be used if the chloride is added to the hot mixture of carboxylic acid salt and dimethyl sulfoxide. Temperature is therefore not critical, but we usually prefer to operate at temperatures of about 20° C. to 120° C.

As an example of my invention, geranyl chloride is stirred for ten hours with one-half its volume of dimethyl sulfoxide and with a slight molar excess of sodium acetate at 75° C. At the end of the reaction time the dimethyl sulfoxide and salts are washed from the crude geranyl acetate. Saponification of the acetate yields a crude product which assays over 75% by weight geraniol plus its cis-trans isomer nerol by vapor phase chromatography. A reaction under the same conditions, but in the absence of dimethyl sulfoxide, yields a product with less than one-third as much geraniol/nerol. The geraniol and nerol may be separated by fractionation if desired, but for many purposes they are equivalent.

As another example of my invention beta pinene is pyrolyzed to obtain a crude product containing about 70% to 80% myrcene. Such a product is hydrochlorinated in the presence of cuprous chloride to obtain a product rich in linalyl/neryl/geranyl chloride (R. Weiss, U.S. Patent 2,882,323, April 14, 1959). Such a product containing about 10% linalyl chloride and 55% to 65% geranyl/neryl chlorides is treated with an equal weight of dimethyl sulfoxide and an excess of sodium acetate above that required to react with the chlorides. It is heated to about 65° C. for fifteen hours, the product is freed of salts by filtration, the filtrate is water washed to remove dimethyl sulfoxide, the oil layer is saponified, the saponified oils are assayed for alcohol content by vapor phase chromatography, and it is found the total alcohol content consisting of linalool, geraniol, and nerol is of the order of 50% to 65%. Depending on the copper content of the reaction mixture, the alcohols may be largely the tertiary alcohol, linalool, or the primary alcohols nerol and geraniol. Thus, traces of copper, about in the order of 0.01% to 0.1% cause production of substantial amounts of linalool, but if copper has been removed from the myrcene hydrochloride, or is not present (as by hydrochlorination of myrcene in the absence of copper), then practically no linalool is produced. If it is wished to obtain the maximum amount of geraniol/nerol and the maximum amount of total alcohols, one could first conduct the reaction in the absence of copper, whereby the geranyl-neryl chlorides are substantially completely converted to nerol/geraniol esters, then add about 0.5% to 5% by weight copper catalyst, suitably cuprous or cupric chloride and continue the reaction for several hours, whereby any linalyl chloride is converted to linalyl ester. The crude ester can then be recovered and saponified to obtain a product rich in geraniol/nerol, but also containing about 5% to 10% linalool. On the other hand, if one wished to produce high yields of linalool and little nerol/geraniol, then one should hydrochlorinate in the presence of copper catalyst and add additional copper catalyst, about 3% to 5% to the reaction mixture of myrcene hydrochloride, salt of the carboxylic acid and dimethyl sulfoxide. After the reaction, separation of dimethyl sulfoxide and saponification of ester the linalool content will be in the order of 50% to 60% by weight of the saponified oil.

Since the treatment of myrcene hydrochloride with a salt of a carboxylic acid in the presence of a catalytic material is an important aspect of this invention, it is important to define this allylic terpenic halide composition. Knapp and Schoene in U.S. Patent 2,609,388 show that myrcene may be hydrohalogenated with 0.75 to 1.25 moles of hydrogen halide per mole of myrcene to yield mixtures of linalyl halide, neryl halide and geranyl halide, and, presumably also, 2-chloro-dihydro(linalyl-geranyl-neryl) halide at least when more than one mole hydrogen halide is added to one mole of myrcene. It is also disclosed that more or less of the hydrogen halide may add to the isolated double bond at the 2-position, thus yielding 2-chloro-2-methyl-6-methylene-7-octene (myrcenyl chloride). It is evident that the composition of myrcene hydrochloride can vary over a wide range, depending upon the ratio of hydrogen halide to myrcene employed. It is also pointed out in this patent that the ratio of allylic isomers can be varied by varying the reaction conditions. Though Knapp and Schoene only specify the ratio of 0.75 to 1.25 moles of hydrogen chloride per mole of myrcene, Example 5 disclosed fifty-eight parts of commercial beta pinene pyrolysate, consisting of about 60% myrcene and 40% limonene were reacted with 16.5 parts of hydrogen chloride. This corresponds to 1.77 mole hydrogen chloride per mole of myrcene. The degree to which the limonene present was hydrochlorinated is not stated. Weiss discloses in U.S. Patent 2,882,323 that when hydrochlorination is conducted in the presence of copper catalysts, including cuprous compounds and copper, that the addition of the hydrogen halide is directed almost exclusively to the conjugate system of myrcene when ratios of about one mole hydrogen halide to one mole of myrcene are used, little myrcenyl chloride being produced. Furthermore, inspection of FIGURE 1 of the said patent, an infrared spectrum of myrcene hydrochlorinated in the presence of copper bronze, shows that the product is quite rich in neryl/geranyl chloride, as indicated by the strong absorption at about 8μ characteristic of these halides. Some linalyl chloride is also present in that product, as shown by the absorption at about 10.8μ, an absorption characteristic of linalyl chloride. It is further shown in U.S. Patent 3,016,408 that cupric chloride and other cupric compounds are useful in obtaining selective addition of hydrogen halide to the conjugate diene portion of the molecule, though it is stated that cupric copper catalyzed addition yields a larger proportion of linalyl chloride than does cuprous catalyzed hydrochlorination. It is stated, however, that this larger proportion of linalyl chloride can be isomerized, if desired, to geranyl chloride by maintaining it at room temperature or below in the presence of cuprous chloride and hydrogen chloride.

Since geranyl chloride and the isomeric neryl chloride, which always accompanies it, and which are equivalent for the purposes of producing geranyl/neryl esters are much more reactive than their allyic isomer, linalyl chloride, it is preferred to use myrcene hydrochloride rich in geranyl/neryl chloride and produced by one of the above or equivalent methods. It is now found, however, that for the purposes of my present invention, I can produce a suitable myrcene hydrochloride, rich in primary allylic chlorides, by hydrochlorination of beta pinene pyrolysate containing about 70% to 90% myrcene, using a ratio of about 0.9 to 1.2 moles of hydrogen chloride per one hundred thirty-six grams beta pinene pyrolysate to obtain a product still rich in diene linkages (myrcene and myrcenyl chloride), then subjecting this product to treatment with about 0.5% to 5% cuprous chloride for a few hours at room temperature or up to several days at about —30° C., whereby (a) as expected from the prior art, linalyl chloride is isomerized to geranyl and neryl chloride and 2-chloro-dihydrolinalyl chloride is isomerized to 2-chloro-dihydrogeranyl chloride, and (b) unexpectedly the diene linkages exhibited by myrcene and myrcenyl chloride disappear with formation of additional amounts of geranyl/neryl chlorides (and/or 2-chloro-dihydro geranyl/neryl chlorides). This unexpected but desirable result may be attributed to the rearrangement of unstable chlorides, such as myrcenyl chloride to geranyl/neryl chloride under the influence of cuprous copper. The progress of the rearrangement may be readily followed by infrared analysis of samples of the myrcene hydrochloride produced without hydrochlorination catalyst before and after addition of the cuprous catalyst. Prior to addition of catalyst the spectrogram strongly resembles FIGURE 2 of U.S. Patent No. 2,882,323, which depicts the product obtained with myrcene and a useless catalyst, in this case, cobaltous chloride. As shown in that spectrogram, much diene (myrcene and/or myrcenyl chloride) is present, as shown by the strong absorptions at about 6.3µ and 11.2µ and little geranyl chloride is present, as shown by the relatively weak absorption at about 8µ. After treatment with cuprous chloride, as described, this product changes so that its spectrogram no longer resembles FIGURE 2, but strongly resembles FIGURE 1, which is rich in primary allylic chloride; i.e., gernayl and neryl chloride, and subtsantially free of conjugated dienes.

While any of the so-called "myrcene hydrochlorides" produced in the various ways cited above may be used, it is preferred to employ products rich in geranyl chloride. The myrcene hydrochloride can contain more or less myrcene dihydrochloride; i.e., more or less myrcene hydrochlorinated at the 2-position. Thus, 2-chloro-dihydrogeranyl chloride can be converted by the present process to 2-chloro-dihydrogeranyl ester, and this product can be dehydrochlorinated by heating at temperatures of about 100° C. in the presence of a base capable of neutralizing the hydrogen chloride produced, such as sodium carbonate.

The dimethyl sulfoxide may be readily removed in any suitable manner from the reaction mixture by virtue of its water solubility and its convenient boiling point which makes it readily separable by distillation from water, and from the esters or alcohols produced by the process of this invention.

It is not necessary to employ sodium carbonate in the practice of this invention, but it may be added in amounts from 5% to 50% by weight, based on the weight of the halide, to the reaction mixture to neutralize any hydrogen halide present in the terpenic allylic halide, or formed during the course of the reaction and thus render the reaction mixture less corrosive to metals.

Pure terpenic allylic halides may be employed, but it is usually more economic to utilize crude hydrochlorides of conjugated dienes or crude chlorination products of unsaturated terpenes/hydroterpenes.

While it is not necessary to use copper catalysts (cuprous or cupric chlorides, cupric carbonates or cupric acetate are cheap and convenient to use), it is found that their presence contributes to higher total alcohol yields, though their presence may influence the ratio of the allylic isomers produced as was indicated above with respect to the allylic alcohols from myrcene hydrochloride; i.e., the presence of copper favors linalyl ester formation.

The identity of the salt of the carboxylic acid is important chiefly for economic reasons. Sodium salts of lower fatty acids are cheapest on a chemical equivalent basis, though potassium, calcium, barium, silver, lead, copper, cobalt and ammonium, or amine salts as disclosed in my prior patents, Nos. 3,031,442 and 3,076,839, may be used. It should be understood that substantially any carboxylic acid can be used, and the lower fatty acids are merely exemplary. The ratio of salt of carboxylic acid to terpenic allylic halide is not critical, though it is preferred to employ at least an equivalent weight of carboxylic acid salt per equivalent weight of terpenic allylic halide. More precisely, the amount of salt to be used should be approximately 1 to 1.25 mole equivalents per each functional or reactive halide. The terpenic allylic halide may of course contain more than one allylic group. For example, one may first chlorinate myrcene to produce 3-chloro-2-methyl-6-methylene-1,7-octadiene, then hydrochlorinate this product in the presence of cuprous chloride to obtain 3-chloro-2,6-dimethyl-1,6-octadienyl-8-chloride and 1-chloro-2,6-dimethyl-2,6-octadienyl-8-chloride. Since these are diallylic terpenic chlorides, two or more moles of the carboxylic acid salt with one mole of terpenic diallylic chloride are employed.

In order to saponify the esters, any conventional method may be used. Any suitable base may be used, but sodium and potassium hydroxide are preferred. Other bases may include barium and calcium hydroxides.

As shown by Example 9, it is not necessary to conduct the process of this invention in the absence of water, since a substantial amount of water may be tolerated; however, usually commercially anhydrous carboxylic acid salts and dimethyl sulfoxide containing not more than about ten to fifteen percent water are used.

*Example 1*

Beta pinene pyrolysate containing about 72% to 75% myrcene was hydrochlorinated at 0° C. to 10° C. in the presence of 0.5% by weight cuprous chloride, using a ratio of approximately 0.88 mole hydrogen chloride to 136 grams pyrolysate. After standing overnight the product was shaken with sodium carbonate and most of the cuprous chloride was filtered off along with the sodium carbonate. The last traces of cuprous chloride were removed by extraction with dilute ammonia followed by several water washes, then the product was dried over anhydrous sodium carbonate. One hundred eighty-seven gram portions of the hydrochloride, rich in geranyl chloride, were reacted with one hundred grams sodium acetate and twenty grams sodium carbonate in the presence of various quantities of dimethyl sulfoxide and for different lengths of time and at different temperatures, as shown in Table I. The nerol/geraniol is reported as percent by weight of the saponified sample and as determined by vapor phase chromatography. Only small amounts of linalool were found in the reaction products.

| Ml. dimethyl sulfoxide | Temperature, ° C. | Time, Hours | Percent Nerol/Geraniol |
|---|---|---|---|
| 60 | 80–85 | 1.4 | 20.5 |
| 60 | 80–85 | 7.6 | 41.2 |
| 60 | 80–85 | 13.4 | 52.7 |
| 120 | 80–85 | 1.4 | 41.7 |
| 120 | 80–85 | 3.3 | 51.7 |
| 200 | 80–85 | 1.3 | 52.2 |
| 200 | 50–55 | 1.3 | 14.9 |
| 200 | 50–55 | 3.2 | 30.9 |
| 200 | 50–55 | 7.6 | 45.6 |
| 200 | 50–55 | 13.4 | 53.0 |
| 200 | 22–26 | 23.0 | 24.4 |
| 200 | 22–26 | 45.0 | 39.0 |
| 200 | 22–26 | 70.0 | 47.0 |
| 200 | 22–26 | 114.0 | 52.0 |

*Example 2*

Beta pinene pyrolysate containing about 72% to 75% myrcene was hydrochlorinated at about 10° C. in the presence of 0.5% cuprous chloride and allowed to stand overnight. Most of the cuprous chloride settled out and myrcene hydrochloride still containing traces of copper was decanted away from the settled solids. One hundred eighty-seven gram portions of the myrcene hydrochloride were each reacted with a mixture of 100 grams sodium acetate, twenty grams sodium carbonate and one hundred eighty-seven grams dimethyl sulfoxide at the temperatures shown tabulated below. The percent linalool and percent geraniol/nerol are percent by weight of saponified samples.

| Temperature, ° C. | Time, Hours | Percent Linalool | Percent Nerol/Geraniol |
|---|---|---|---|
| 80–85 | 12.5 | 19.5 | 44.5 |
| 22–26 | 170.0 | 30.0 | 36.3 |

Less linalool is found when the reaction is conducted at higher temperatures probably because of the lesser stability of the cuprous catalyst in the presence of bases at higher temperatures.

*Example 3*

A mixture of one hundred eight-seven grams dimethyl sulfoxide, one hundred grams sodium acetate and twenty grams sodium carbonate was heated to 110–115° C. A mixture of one hundred eighty-seven grams myrcene hydrochloride and eight grams of cuprous chloride was then added over a period of one hour to the reaction mixture which was controlled at 110–115° C. Fifteen minutes after the addition was complete a sample was taken, washed with water and then saponified. The saponified oil was analyzed by vapor phase chromatography and found to contain 27% linalool, 5.6% terpineol and 30.5% nerol/geraniol by weight.

In a like experiment, except that sodium carbonate was eliminated, the saponified oil analyzed 49% linalool, 6.2% terpineol and 8% nerol/geraniol.

*Example 4*

One hundred eighty-seven gram portions of myrcene hydrochloride prepared as in Example 2 were treated with 100 grams sodium acetate, twenty-six grams sodium carbonate, ten grams cuprous chloride and twenty grams dimethyl sulfoxide. One mixture was stirred at 65° C. for 45 minutes, then water washed and saponified to yield a saponification product analyzing 57.5% linalool, 3% terpineol and 3% geraniol/nerol. A second like mixture was agitated for twenty hours at 22° C. to 27° C. and water washed and saponified to yield a product analyzing 58.3% linalool, 3.5% terpineol and 3.5% nerol/geraniol.

It is to be noted that the copper catalyzed reaction of the terpenic allylic halide with the salt of a carboxylic acid in the presence of dimethyl sulfoxide to produce linalyl esters is much more rapid than like reactions (see Example 1) when copper is absent and geraniol/nerol esters are the products rather than linalool.

*Example 5*

Myrcene dihydrochloride (rich in 2-chlorodihydrogeranyl chloride), pinocarvyl chloride, carvyl bromide, geranyl bromide, 8-chlorocarvotanacetyl chloride, 3-chloro-2,6-dimethyl-1,6-octadiene, 3-chloro-2,6-dimethyl-1,4,6-octatriene are treated individually with 60% by weight anhydrous sodium acetate and 150% by weight dimethyl sulfoxide at 60° C. to 80° C. for ten hours. The products are washed free of salts and dimethyl sulfoxide and assayed for ester content by infrared analysis. The ester content is found to be three to eight times as great as when the same reactions are run without dimethyl sulfoxide.

*Example 6*

One hundred eighty-seven grams myrcene hydrochloride containing about 60% geranyl chloride and traces of copper was treated at room temperature with eighty grams sodium formate, ten grams sodium carbonate and 200 ml. dimethyl sulfoxide with shaking for thirty hours, then the mixture stood for three days. After the product was washed and saponified with methanolic potassium hydroxide, the crude alcohol mixture analyzed 4% linalool, 30% geraniol, and 24% methyl ethers of nerol and geraniol showing that a longer reaction time or higher temperature is required with these particular reactants.

*Example 7*

In a series of experiments, one part myrcene hydrochloride containing about 60% geranyl chloride is treated with twice its weight of the salt of various carboxylic acids and an equal weight of dimethyl sulfoxide at 90–100° C. for six hours. The sodium salts used are sodium butyrate, sodium benzoate, sodium oleate, potassium acetate, potassium isovalerate. The products are washed with water, saponified and the dried oil layer is assayed by infrared spectroanalysis. The products are found to contain 40% to 60% alcohols, largely a mixture of nerol and geraniol.

In a like set of experiments 0.1 part of cuprous chloride is added to the mixture before heat is applied. The isolated saponified and washed product is usually richer in terpenic allylic alcohol and in most cases the proportion of the allylic terpene alcohol isomers is changed somewhat so that more linalool is produced.

*Example 8*

One hundred thirty-six grams of distilled beta pinene pyrolysate was hydrochlorinated with thirty-eight grams hydrogen chloride at 0° C. to 10° C. The product was rich in conjugate diene linkages and linalyl chloride, as shown by its infrared spectrum, and contained little geranyl chloride. Six grams cuprous chloride was then added and the product was stored for about thirty-six hours at about 10° C. The infrared spectrum had now changed so that only traces of conjugate diene linkages were apparent, absorption bands characteristic of linalyl chloride were much reduced, and geranyl chloride had been formed in good yield.

The product was treated with an equal volume of dimethyl sulfoxide, one hundred grams sodium acetate, and fifty grams sodium carbonate at 80° C. for ten hours. The temperature was then raised to 120° C. to cause elimination of any chlorine attached to the 2-position. On cooling the product was filtered and the filter cake consisting of salts was thoroughly washed with hexane. The combined reaction product and washings separated into two layers. The lower layer was dimethyl sulfoxide containing a little ester and the upper layer contained hydrocarbons, esters and a trace of dimethyl sulfoxide. Saponification of the upper layer followed by distillation yielded good quality linalool and traces of terpineol and geraniol/nerol. A small amount of hydroxy-dihydrolinalool was detected.

*Example 9*

A mixture of 100 ml. myrcene hydrochloride (rich in geranyl chloride and containing about 0.3% copper chlorides), 100 g. dimethyl sulfoxide, 20 ml. water, 50 g. sodium acetate and 10 g. sodium carbonate was heated and stirred at 80° C. to 85° C. for four hours. When stirring stopped at the end of the reaction, the mixture separated immediately into two layers and salts deposited. The upper oil phase contained little dimethyl sulfoxide and was rich in esters as determined by infrared assay. A sample of this oil was saponified and assayed by vapor phase chromatography, whereupon it was found to contain 11.5% linalool, 4% terpineol and 45% nerol/geraniol.

In other tests equivalent weights of sodium acetate trihydrate were used in the absence of added water and results were similar.

Dimethyl sulfoxide proved to be effective as a "solvent catalyst" when diluted with still larger amounts of water, but no particular advantage is achieved by such dilution, and with large amounts of water the reaction usually yields larger quantities of terpineol, a less desirable product than linalool/geraniol/nerol.

From the foregoing detailed description, it will be evident that there are a number of changes, adaptations, and modifications of the present invention which come within the province of those skilled in the art. However, it is intended that all such variations not departing from the spirit of the invention be considered as within the scope thereof as limited solely by the appended claims.

I claim:

1. An improved process for preparing terpene allylic esters which comprises subjecting a terpene allylic halide, in which the halogen is selected from the class consisting of chlorine and bromine, to a reaction at a temperature up to approximately 175° C. by treatment with 1–1.25 mole equivalents of carboxylic acid salt selected from the group consisting of potassium, sodium, amine, ammonium, calcium, silver, barium, lead, copper, and cobalt salts of lower fatty acids in the presence of dimethyl sulfoxide in the amount of 5–500% by weight of the halide.

2. The process of claim 1 in which the terpene allylic halide is geranyl chloride.

3. The process of claim 1 in which the terpene allylic halide is mycrene hydrochloride.

4. The process of claim 1 in which the terpene allylic halide is a cyclic terpene allylic halide.

5. The process of claim 1 wherein .01%–5% by weight of a copper catalyst is added.

6. The process of claim 1 wherein the terpene allylic halide is a mixture of halides formed from the hydrohalogenation of beta pinene pyrolysate.

7. The process of claim 6 wherein a copper catalyst is present in the amount of .01%–5% by weight.

8. In a process for producing 2,6-dimethyl-octadienyl esters wherein myrcene hydrochloride is treated with 1–1.25 mole equivalents of the salt of a carboxylic acid selected from the group consisting of potassium, sodium, amine, ammonium, calcium, silver, barium, lead, copper, and cobalt salts of lower fatty acids, the improvement which consists essentially in effecting the reaction at a temperature up to approximately 175° C. in the presence of dimethyl sulfoxide in the amount of 5–500% by weight of the hydrochloride.

9. In a process for producing geranyl and neryl esters wherein geranyl chloride is treated with 1–1.25 mole equivalents of the salt of a carboxylic acid selected from the group consisting of potassium, sodium, amine, ammonium, calcium, silver, barium, lead, copper, and cobalt salts of lower fatty acids, the improvement which consists essentially in effecting the reaction at a temperature up to approximately 175° C. in the presence of 5%–500% dimethyl sulfoxide based on the weight of the geranyl chloride.

10. An improved process for preparing terpene allylic esters which comprises subjecting a terpene allylic halide wherein the halogen is selected from the group consisting of chlorine and bromine to a reaction at a temperature up to approximately 175° C. by treatment with at least one mole equivalent of a carboxylic acid salt selected from the group consisting of potassium, sodium, amine, ammonium, calcium, silver, barium, lead, copper, and cobalt salts of lower fatty acids in the presence of 5%–500% dimethyl sulfoxide by weight of the halide.

11. The process of claim 10 wherein the reaction occurs in the presence of .01%–5% by weight of a copper catalyst.

12. The process of claim 10 wherein 5–50% by weight of the halide of sodium carbonate is added.

13. The process of claim 10 wherein myrcene hydrochloride is the terpene allylic halide.

14. An improved process for preparing terpene allylic esters which comprises subjecting a terpene allylic halide wherein the halogen is selected from the group consisting of chlorine and bromine to a reaction at a temperature up to approximately 175° C. by treatment with at least one mole equivalent up to 1.25 mole equivalents of a carboxylic acid salt selected from the group consisting of potassium, sodium, amine, ammonium, calcium, silver, barium, lead, copper, and cobalt salts of lower fatty acids in the presence of .01%–5% by weight of a copper catalyst, 5%–50% by weight sodium carbonate, and 5%–500% dimethyl sulfoxide by weight of the halide.

15. The process of claim 14 wherein the terpene allylic halide is myrcene hydrochloride.

References Cited by the Examiner

UNITED STATES PATENTS

| | | | |
|---|---|---|---|
| 2,794,826 | 6/1957 | Bell | 260—489 |
| 2,861,098 | 11/1958 | Di Sanza | 260—493 |
| 3,076,839 | 2/1963 | Webb | 260—489 |
| 3,102,134 | 8/1963 | Bain | 260—489 |

OTHER REFERENCES

Kharasch: Organic Sulfur Compounds, vol. 1, pages 173–178 (1961).

LORRAINE A. WEINBERGER, *Primary Examiner.*

LEON ZITVER, *Examiner.*

D. P. CLARKE, V. GARNER, *Assistant Examiners.*